United States Patent
Zeng et al.

(10) Patent No.: US 11,463,278 B2
(45) Date of Patent: Oct. 4, 2022

(54) MESSAGE TRANSMISSION METHODS AND APPARATUSES

(71) Applicant: ALIPAY (HANGZHOU) INFORMATION TECHNOLOGY CO., LTD., Zhejiang (CN)

(72) Inventors: Chao Zeng, Hangzhou (CN); Jiang Wang, Hangzhou (CN); He Sun, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,656

(22) Filed: Jun. 30, 2021

(65) Prior Publication Data

US 2021/0328831 A1 Oct. 21, 2021

(30) Foreign Application Priority Data

Sep. 25, 2020 (CN) .......................... 202011021669.0

(51) Int. Cl.
*H04L 12/66* (2006.01)
*H04L 25/20* (2006.01)
(Continued)

(52) U.S. Cl.
CPC .......... *H04L 12/4633* (2013.01); *G06F 16/27* (2019.01); *H04L 7/0008* (2013.01);
(Continued)

(58) Field of Classification Search
CPC ...... H04W 4/80; H04W 84/20; H04L 63/123; H04L 9/0637; H04L 63/0428; H04L 63/18; G06Q 20/36; G06Q 20/065
See application file for complete search history.

(56) References Cited

U.S. PATENT DOCUMENTS

| 10,417,217 B2 | 9/2019 | Pierce et al. |
| 10,757,084 B1 | 8/2020 | Yu |

(Continued)

FOREIGN PATENT DOCUMENTS

| CN | 1599350 | 3/2005 |
| CN | 102769889 | 11/2012 |

(Continued)

OTHER PUBLICATIONS bitcoinfibre.org [online], "FIBRE," available no later than Jul. 2016, retrieved on Aug. 24, 2021, retrieved from URL<https://bitcoinfibre.org/>, 4 pages.

(Continued)

*Primary Examiner* — Iqbal Zaidi
(74) *Attorney, Agent, or Firm* — Fish & Richardson P.C.

(57) ABSTRACT

One or more embodiments of this specification provide a message transmission method and apparatus applied to a relay node in a blockchain relay communication network. The method includes: receiving, by a relay node in a blockchain relay communication network, a plurality of message packets, each message packet configured to record a partial message content of a message to be transmitted; parsing, by the relay node, the plurality of message packets to obtain encapsulation information of the message to be transmitted, the encapsulation information configured to indicate a type of a blockchain message within the encapsulation information in the message to be transmitted; determining, by the relay node, that the encapsulation information indicates that the blockchain message is a block synchronization message; and forwarding, by the relay node, at least one of the plurality of message packets without receiving all of the plurality of message packets corresponding to the message to be transmitted.

20 Claims, 5 Drawing Sheets

(51) Int. Cl.
  *H04L 45/02* (2022.01)
  *H04L 69/22* (2022.01)
  *H04L 12/46* (2006.01)
  *G06F 16/27* (2019.01)
  *H04L 7/00* (2006.01)

(52) U.S. Cl.
  CPC .............. *H04L 12/66* (2013.01); *H04L 25/20* (2013.01); *H04L 45/02* (2013.01); *H04L 69/22* (2013.01); *H04L 2212/00* (2013.01)

(56) References Cited

U.S. PATENT DOCUMENTS

| | | | |
|---|---|---|---|
| 2010/0195491 | A1 | 8/2010 | Gray et al. |
| 2014/0022902 | A1 | 1/2014 | Uppunda et al. |
| 2014/0173331 | A1* | 6/2014 | Martin ............... G06F 11/2002 714/4.11 |
| 2017/0352027 | A1 | 12/2017 | Zhang et al. |
| 2018/0212970 | A1 | 7/2018 | Chen et al. |
| 2019/0082007 | A1 | 3/2019 | Klarman et al. |
| 2020/0177387 | A1* | 6/2020 | Qiu ....................... H04L 63/123 |
| 2020/0177572 | A1 | 6/2020 | Qui |
| 2021/0004297 | A1* | 1/2021 | Scrivner ............. G06F 16/2379 |
| 2021/0281578 | A1* | 9/2021 | Olson ................. H04L 63/0209 |

FOREIGN PATENT DOCUMENTS

| | | |
|---|---|---|
| CN | 103533569 | 1/2014 |
| CN | 103916423 | 7/2014 |
| CN | 104753980 | 7/2015 |
| CN | 105306232 | 2/2016 |
| CN | 107147735 | 9/2017 |
| CN | 107231299 | 10/2017 |
| CN | 107239940 | 10/2017 |
| CN | 107800795 | 3/2018 |
| CN | 107846718 | 3/2018 |
| CN | 108829749 | 11/2018 |
| CN | 109039847 | 12/2018 |
| CN | 109635165 | 4/2019 |
| CN | 109639550 | 4/2019 |
| CN | 109784881 | 5/2019 |
| CN | 109996306 | 7/2019 |
| CN | 110213224 | 9/2019 |
| CN | 110445882 | 11/2019 |
| CN | 110474846 | 11/2019 |
| CN | 110602201 | 12/2019 |
| CN | 110650189 | 1/2020 |
| CN | 110737664 | 1/2020 |
| CN | 110741400 | 1/2020 |
| CN | 110751475 | 2/2020 |
| CN | 111066286 | 4/2020 |
| CN | 111132258 | 5/2020 |
| CN | 111245745 | 6/2020 |
| CN | 111277549 | 6/2020 |
| CN | 111277562 | 6/2020 |
| CN | 111353175 | 6/2020 |
| CN | 111447290 | 7/2020 |
| CN | 111522833 | 8/2020 |
| CN | 111541689 | 8/2020 |
| KR | 20180129028 | 12/2018 |
| WO | WO 2020098835 | 5/2020 |

OTHER PUBLICATIONS

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "Blox Route," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21181694.7, dated Dec. 1, 2021, 8 pages.

\* cited by examiner

| 8bit | 8bit | 8bit | 8bit |
|---|---|---|---|
| Magic number (magic number) | | Version (ver) Compress (compress) | Header length (hdr_len) |
| Message type (cmd id) | | Quality of service (Qos)Priority (priority) | Control information (flag) |
| Data length (payload length) | | | |
| Message transmission number (trackid) | | | |

US 11,463,278 B2

1

MESSAGE TRANSMISSION METHODS AND APPARATUSES

CROSS-REFERENCE TO RELATED APPLICATIONS

This application claims priority to Chinese Patent Application No. 202011021669.0, filed on Sep. 25, 2020, which is hereby incorporated by reference in its entirety.

TECHNICAL FIELD

One or more embodiments of this specification relate to the field of blockchain technologies, and in particular, to message transmission methods and apparatuses.

BACKGROUND

The blockchain technology (also referred to as the distributed ledger technology) is a decentralized distributed database technology, featured by being decentralized, open, transparent, immutable, trustworthy, or the like, and is suitable for many application scenarios with high requirements on data reliability.

SUMMARY

In view of this, one or more embodiments of this specification provide message transmission methods and apparatuses.

To achieve the previously described objective, one or more embodiments of this specification provide the following technical solutions.

According to a first aspect of one or more embodiments of this specification, a message transmission method applied to a relay node in a blockchain relay communication network is provided. The method includes:

receiving a message packet, each message packet being configured to record a partial message content of a message to be transmitted;

parsing the received message packet to obtain encapsulation information of the message to be transmitted, the encapsulation information being configured to indicate a type of a blockchain message located behind the encapsulation information in the message to be transmitted; and if the encapsulation information indicates that the blockchain message is a block synchronization message, forwarding the received message packet without receiving all message packets corresponding to the message to be transmitted.

According to a second aspect of the one or more embodiments of this specification, a message transmission method is provided, including:

obtaining a blockchain message generated by a blockchain node;

adding encapsulation information before the blockchain message, to encapsulate the blockchain message into a message to be transmitted, where the encapsulation information is configured to indicate a type of the blockchain message; and partitioning a partial message content of the message to be transmitted into a message packet, and sending the message packet to a relay node corresponding to the blockchain node in a blockchain relay communication network for the relay node to forward the received message packet without receiving all message packets corresponding to the message to be

2 transmitted, when the blockchain message is determined to be a block synchronization message according to the encapsulation information.

According to a third aspect of the one or more embodiments of this specification, a message transmission apparatus is provided, including:

a receiving unit, configured to receive a message packet, each message packet being configured to record a partial message content of a message to be transmitted;

a parsing unit, configured to parse the received message packet to obtain encapsulation information of the message to be transmitted, the encapsulation information being configured to indicate a type of a blockchain message located behind the encapsulation information in the message to be transmitted; and a forwarding unit, configured to, if the encapsulation information indicates that the blockchain message is a block synchronization message, forward the received message packet without receiving all message packets corresponding to the message to be transmitted.

According to a fourth aspect of the one or more embodiments of this specification, a message transmission apparatus is provided, including:

an acquisition unit, configured to obtain a blockchain message generated by a blockchain node;

an adding unit, configured to add encapsulation information before the blockchain message, to encapsulate the blockchain message into a message to be transmitted, where the encapsulation information is configured to indicate a type of the blockchain message; and a sending unit, configured to partition a partial message content of the message to be transmitted into a message packet, and send the message packet to a relay node corresponding to the blockchain node in a blockchain relay communication network for the relay node to forward the received message packet without receiving all message packets corresponding to the message to be transmitted, when the blockchain message is determined to be a block synchronization message according to the encapsulation information.

According to a fifth aspect of the one or more embodiments of this specification, an electronic device is provided, including:

a processor; and a memory configured to store instructions executable by the processor; where the processor executes the executable instructions to implement the method according to the first aspect or the second aspect.

According to a sixth aspect of the one or more embodiments of this specification, a computer-readable storage medium is provided, where the medium stores computer instructions, the instructions, when executed by a processor, implement steps of the method according to the first aspect or the second aspect.

DESCRIPTION OF THE EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The embodiments described in the following explanatory embodiments are not all the embodiments consistent with one or more embodiments of this specification, but are instead only examples of methods and apparatuses that are described in detail in the appended claims and that are consistent with some aspects of one or more embodiments of this specification.

It should be noted that in other embodiments, the steps of corresponding methods are not necessarily performed based on a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Figure 1:
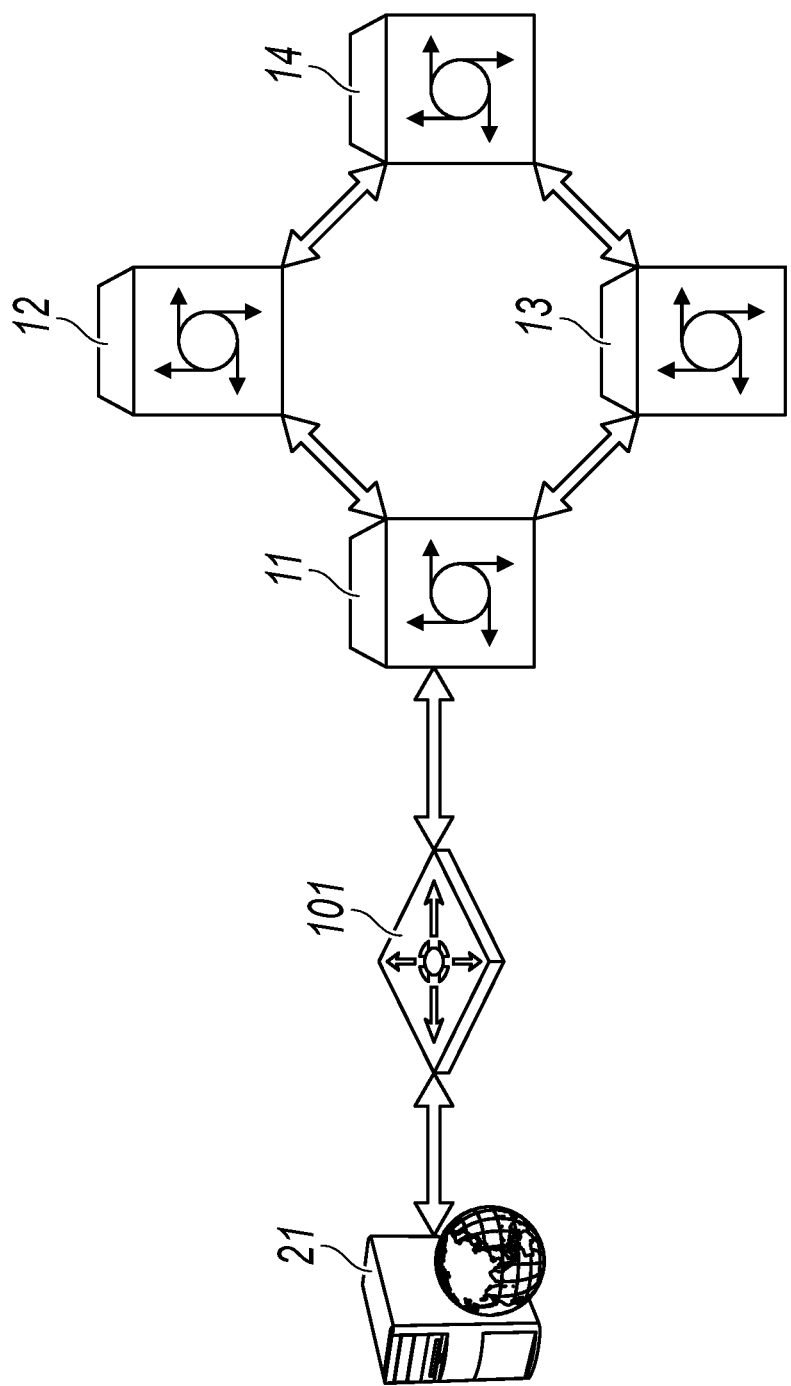
FIG. 1 is a schematic diagram showing an interaction between a blockchain node and a blockchain relay communication network, according to an explanatory embodiment.

FIG. 1 is a schematic diagram showing interaction between a blockchain node and a blockchain relay communication network, according to an explanatory embodiment. As shown in FIG. 1, assuming a blockchain relay communication network includes a plurality of relay nodes such as a relay 11, a relay 12, a relay 13, and a relay 14. Taking the relay 11 for example, the relay 11 can be connected to a node 21 in a blockchain network through a gateway 101. Similarly, another relay node can also be connected to another blockchain node in the blockchain network. The gateway 101 is configured to assist the node 21 to access the blockchain relay communication network. The gateway 101 is logically equivalent to a blockchain node in the blockchain network, but the gateway 101 does not participate in blockchain consensus. In this way, the node 21 can communicate with the gateway 101 through a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or another device independent of the relay 11 and the node 21, which is not limited in this specification.

The blockchain network includes a plurality of blockchain nodes, and communication operations such as consensus, transaction transmission, and block synchronization need to be implemented between the blockchain nodes. In the related art, a peer-to-peer (P2P) technology is directly used for communication between the blockchain nodes to transmit transactions, blocks, or the like, but due to various network factors, a communication delay is high and stability is poor, which cannot meet application needs. Therefore, similar to the node 21, each blockchain node can access the relay node in the blockchain relay communication network respectively. In this way, the blockchain nodes can communicate with each other through the blockchain relay communication network. As the blockchain relay communication network is a backbone relay communication network facing real-time transmission of blockchains, the relay nodes can communicate and interact with each other through a high-quality bandwidth guaranteed by high QoS. Therefore, the blockchain relay communication network takes over an intermediate link of communication between the blockchain nodes can reduce the communication delay and improve the stability, and improve a communication quality between the blockchain nodes significantly.

The blockchain relay communication network can be applied to various types of blockchain networks, including a public chain, a private chain, a consortium chain, or the like. For example, the blockchain relay communication networks applied to the public chains mainly include Falcon, Fast Bitcoin Relay Network (FBRN), Fast Internet Bitcoin Relay Engine (FIBRE), or the like; and the blockchain relay communication networks applied to the consortium chains mainly include BloXRoute, Blockchain Transmission Network (BTN), or the like. However, the blockchain relay communication networks in the related art can only play a relay role in the communication process between the blockchain nodes, and have no essential difference from a P2P transmission mechanism adopted when no blockchain relay communication network is used.

Figure 2:
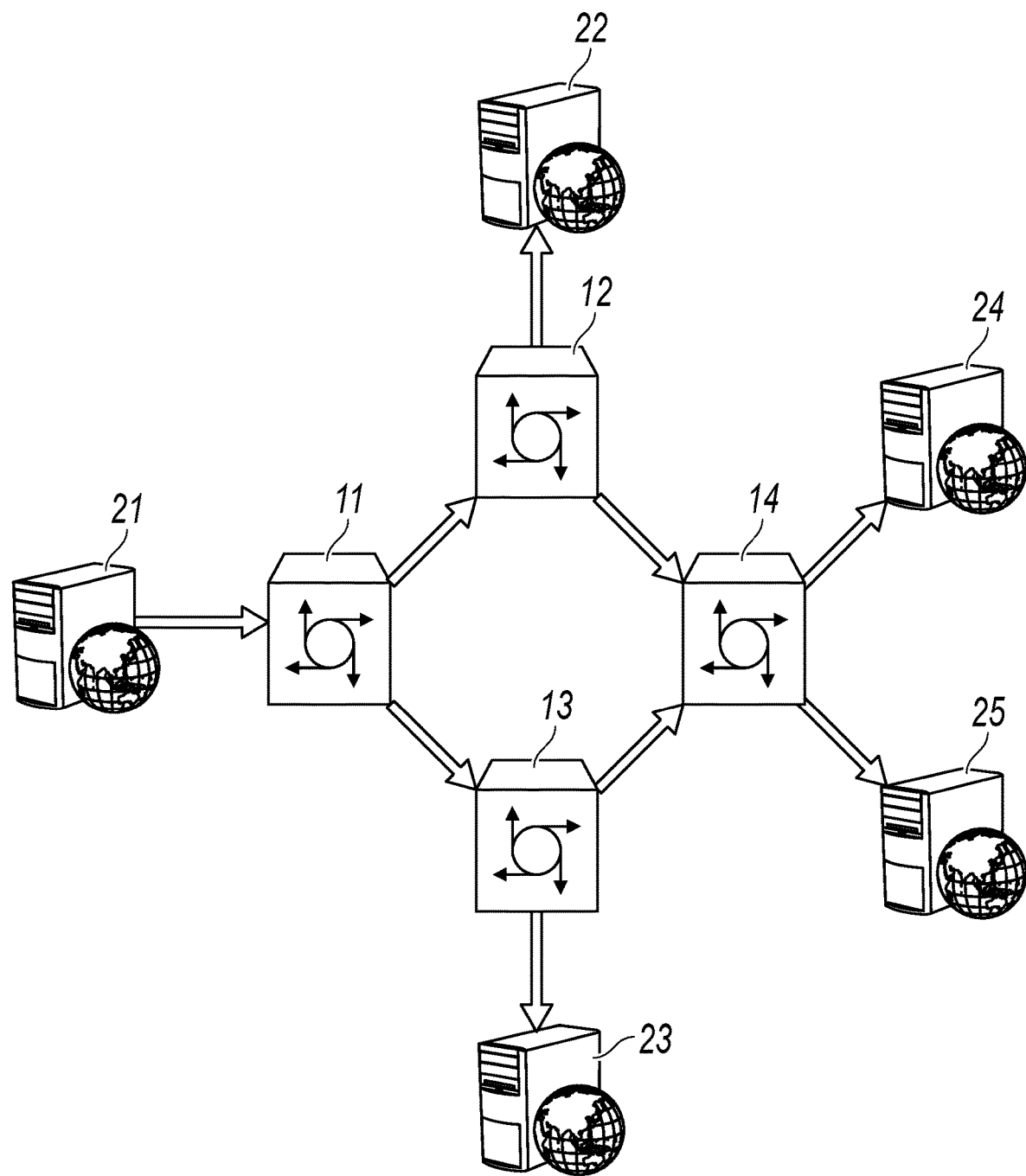
FIG. 2 is a schematic diagram of a message transmission scenario, according to an explanatory embodiment.

Take a message transmission scenario shown in FIG. 2 for example. Assuming the node 21 in the blockchain network is connected to the relay 11 in the blockchain relay communication network, a node 22 is connected to the relay 12, a node 23 is connected to the relay 13, and nodes 24 to 25 are connected to the relay 14. To facilitate understanding, the previously described gateway (such as the gateway 101) is omitted herein.

When the node 21 sends a message to the node 22 and the node 24, the node 21 first sends the message to the relay 11, and the relay 11 forwards the message to the relay 12 and the relay 13 separately after receiving the completed message. The relay 12 forwards the message to the node 22 on one hand after receiving the completed message, and forwards the message to the relay 14 on the other hand. The relay 13 forwards the message to the node 23 on one hand after receiving the completed message, and forwards the message to the relay 14 on the other hand. The relay 14 forwards the message to the node 24 and the node 25 after receiving the completed message. Consequently, the message from the node 21 is received by the node 22 and the node 24, and also received by the node 23 and the node 25. However, the operation of forwarding the message to node 25 by the relay 14, the operation of forwarding the message to the relay 13 by the relay 11, and the operation of separately forwarding the message to the relay 14 and the node 23 by the relay 13 are not necessary. These operations cause waste of communication resources, and reduce a message sending efficiency.

To save the communication resources, improve the message sending efficiency, and realize a more efficient communication process through the blockchain relay communication network, this specification provides a new message transmission solution.

Figure 3:
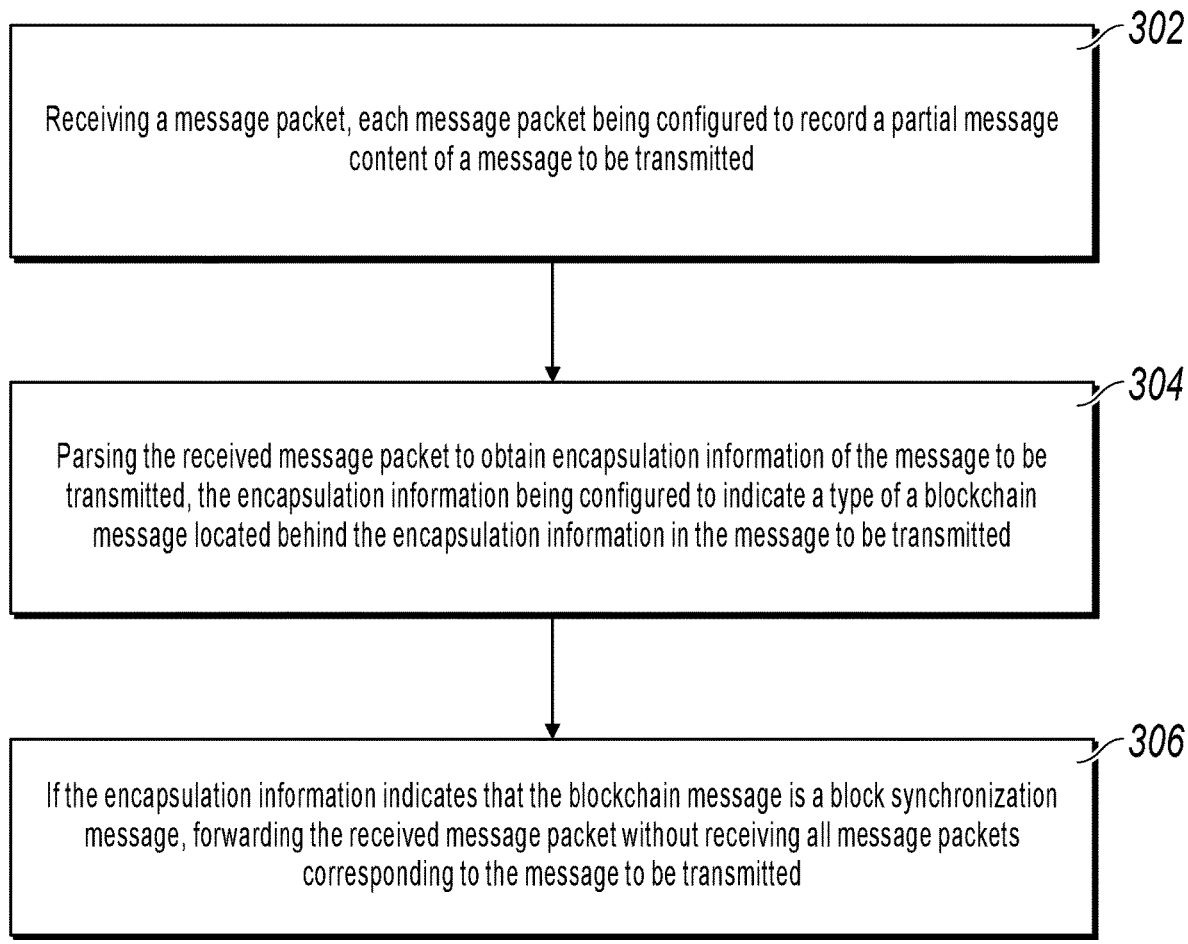
FIG. 3 is a flowchart of a message transmission method, according to an explanatory embodiment.

FIG. 3 is a flowchart of a message transmission method, according to an explanatory embodiment. As shown in FIG.

3, the method is applied to a relay node in a blockchain relay communication network. The method can include the following steps.

Step 302. Receiving a message packet, each message packet being configured to record a partial message content of a message to be transmitted.

The blockchain relay communication network can be layered on a control plane and a data plane. The concepts of the control plane and the data plane come from software defined network (SDN). The SDN separates a forwarding control strategy of network data from the data transmission process, so that the forwarding control strategy can be freely defined and the data transmission can be more general and efficient. For the blockchain relay communication network, the control plane can be understood as a message routing policy, and the data plane refers to transmission of a blockchain message in the blockchain relay communication network.

The relay node pertaining to the blockchain relay communication network can receive a message packet from a blockchain node connected to the relay node. The message content of the message to be transmitted can be partitioned into different message packets. Each message packet records a partial message content of the message to be transmitted. Alternatively, the relay node can receive the message packet from another relay node in the blockchain relay communication network, which is not limited in this specification.

Step 304. Parsing the received message packet to obtain encapsulation information of the message to be transmitted, the encapsulation information being configured to indicate a type of a blockchain message located behind the encapsulation information in the message to be transmitted.

The relay node can obtain the encapsulation information of the message to be transmitted by parsing the received message packet, while the encapsulation information can be configured to indicate a type of a blockchain message behind the encapsulation information in the message to be transmitted. The blockchain message can be generated by communication operations such as consensus, transaction transmission, and block synchronization implemented between the blockchain nodes.

The encapsulation information of the message to be transmitted can also include an object identifier of a target transmission object of the message to be transmitted. The object identifier can be a node identifier of a blockchain node, then the target transmission object is a target blockchain node corresponding to the node identifier; or the object identifier can be a set identifier of a blockchain node set, then the target transmission object refers to all blockchain nodes in a target blockchain node set corresponding to the set identifier. The target transmission object of the message to be transmitted can be determined through the encapsulation information, so that purposeful message transmission can be realized without unnecessary data interaction between the relay nodes or between the relay nodes and the blockchain nodes, and waste of communication resources can be avoided. The relay node can register the blockchain node initiating a registration request to a corresponding blockchain node set, and the blockchain node can freely configure a blockchain node set to which the blockchain node pertains based on application (or service) needs by submitting the registration request. The blockchain node can change the blockchain node set to which the blockchain node pertains flexibly.

The encapsulation information of the message to be transmitted can also be configured to indicate the message type of the message to be transmitted, and there is a correlation relationship between the message type of the message to be transmitted and the target transmission object. When the message type of the message to be transmitted is a first type, the object identifier of the target transmission object previously described is a node identifier of a blockchain node; when the message type of the message to be transmitted is a second type, the object identifier of the target transmission object previously described is a set identifier of a blockchain node set. The relay node can quickly know a message type of a corresponding message to be transmitted by reading a field indicating the message type of the message to be transmitted in the encapsulation information, which is convenient for subsequent statistics of message types of all messages to be transmitted received by each relay node.

Take the nodes 21 to 25 mentioned above for example: assuming the node 24 and the node 25 joint the same blockchain node set by sending a registration request in advance, and a set identifier of the blockchain node set may be Group01.

Figures 4, 5:
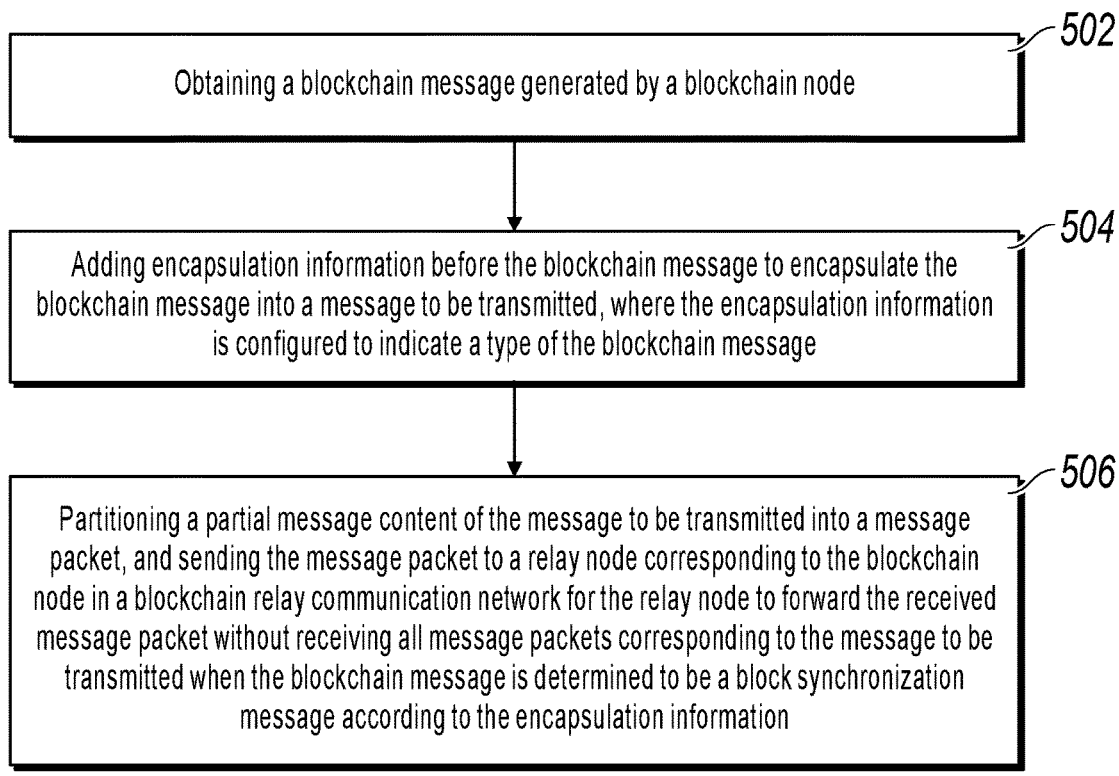
FIG. 4 is a schematic diagram of encapsulation information, according to an explanatory embodiment.
FIG. 5 is a flowchart of a message transmission method, according to an explanatory embodiment.

Assuming the encapsulation information of the message to be transmitted includes two parts: encapsulation information 1 and encapsulation information 2. The encapsulation information 1 and the encapsulation information 2 can be configured to interpret and describe a blockchain message in the message to be transmitted. A format of the encapsulation information 1 can be as shown in FIG. 4, and a message type field, which is a cmd id field, can be configured to indicate the message type of the message to be transmitted. For example, when the cmd id field is 0, the field represents that the message type of the message to be transmitted is the first type sent to a designated blockchain node, and when the cmd id field is 1, the field means represents that the message type of the message to be transmitted is the second type sent to a designated blockchain node set. In addition, a magic number field can be configured to represent a protocol application. A version field, which is a ver field, can be configured to represent a version number of a protocol header. A compress field can be configured to represent data compression information. For example, when the compress field is 0, the field represents uncompressed. When the compress field is 1, the field represents a corresponding compression algorithm, or the like. A header length field, which is a hdr_len field, can be configured to represent a length of the encapsulation information 1. A quality of service field, which is a Qos field, can be configured to represent a quality of service of the message transmission. A priority field can be configured to represent a priority relationship between the blockchain messages. For a blockchain message with higher priority, the relay node can preferentially schedule forwarding. A control information field, which is a flag field, can be configured to add control information, such as a routing policy, in a process of transmitting the blockchain message. A data length field, which is a payload length field, can be configured to represent a length of the encapsulation information 1. A message transmission number field, which is a trackid field, can be configured to represent a transmission number of the blockchain message. Certainly, the message to be transmitted can also include an extension field, and the extension field can set corresponding information based on actual needs, which is not limited in this specification.

The encapsulation information 2 can include a from field, a to field, a raw_data_type field and a raw_data_len field. The from field can be configured to represent an identifier information of the blockchain node sending the blockchain message in the message to be transmitted. The to field is configured to represent the object identifier of the target transmission object of the message to be transmitted. The object identifier can be the node identifier of the blockchain node or the set identifier of the blockchain node set. When the cmd id field in the encapsulation information 1 is 0, the object identifier is the node identifier of the blockchain node; and when the cmd id field in the encapsulation information 1 is 1, the object identifier is the set identifier of the blockchain node set. The raw_data_type field can be configured to represent the message type of the blockchain message in the message to be transmitted. For example, when the raw_data_type field is 0, the field represents that the blockchain message is generated by consensus between the blockchain nodes. When the raw_data_type field is 1, the field represents that the blockchain message is generated by transactions between the blockchain nodes. When the raw_data_type field is 3, the field represents that the blockchain message is a block synchronization message. A type of a blockchain message corresponding to a value of the raw_data_type field can be set based on actual needs, which is not limited in this specification. The raw_data_len field can be configured to represent a length of the blockchain message.

Assuming the relay node 11 receives the message packet sent by the node 21, the relay node 11 can obtain encapsulation information of a message A to be transmitted by parsing the received message packet, and the cmd id field in the encapsulation information 1 included in the encapsulation information is 1, then the field indicates that the message type of the message to be transmitted is the second type sending to the designated blockchain node set. When the raw_data_type in the encapsulation information 2 included in the encapsulation information is 3, then the field indicates that the type of the blockchain message in the message A to be transmitted is a block synchronization message; the to field in the encapsulation information 2 is Group01, then the field indicates that the message A to be transmitted is transmitted to the blockchain node set Group01 by the node 21.

Step 306. If the encapsulation information indicates that the blockchain message is a block synchronization message, forwarding the received message packet without receiving all message packets corresponding to the message to be transmitted.

When the relay node determines that the blockchain message in the message to be transmitted is a block synchronization message based on the obtained encapsulation information of the message to be transmitted previously described, and the encapsulation information includes an object identifier for indicating a target transmission object of the message to be transmitted, the relay node can determine a target blockchain node corresponding to the object identifier and a target relay node in the blockchain relay communication network and connected to the target blockchain node, by querying a routing table. The routing table can record a connection relationship between each blockchain node and the relay node. The relay node can directly determine whether the blockchain message in the corresponding message to be transmitted is the block synchronization message and the object identifier of the target transmission object of the message to be transmitted through the encapsulation information. In this case, the relay node does not need to parse or identify the blockchain message in the message to be transmitted, which can avoid invading a blockchain service logic corresponding to the blockchain message, make each relay node in the blockchain relay communication network transparent to the blockchain service logic, and improve a processing efficiency of the relay node on the blockchain message. In that way, the blockchain message in the message to be transmitted can also be encrypted, and the relay node can directly transmit the encrypted blockchain message, which can ensure a transmission security of the blockchain message.

When the relay node determines that the blockchain message in the message to be transmitted is the block synchronization message based on the encapsulation information, the relay node can forward the received message packet without receiving all the message packets corresponding to the message to be transmitted. The relay node can forward the received message packet to the target blockchain node or the target relay node, and then the relay node can immediately start forwarding the received message packet to the target blockchain node or the target relay node after receiving each message packet, without waiting until a plurality of message packets containing all the message content of the message to be transmitted are downloaded, which can accelerate a transmission speed of the message to be transmitted. Similarly, each relay node in the blockchain relay communication network can forward the received message packet to the target blockchain node or the target relay node, when it is determined that the blockchain message in the message to be transmitted is the block synchronization message based on the encapsulation information, and then immediately start forwarding each message packet to the target blockchain node or another relay node after receiving the message packet. In this case, none of the messages to be transmitted recorded in the message packets forwarded by the relay node is a complete message, but only includes a part of the message to be transmitted, which probably includes only a part of the encapsulation information or only includes a part of the blockchain message, or the like, thus reducing a volume of the transmitted message packet, accelerating a propagation speed of the message packet, which is, accelerating a propagation speed of the message to be transmitted, and reducing resource consumption in the blockchain relay communication network.

Certainly, each relay node can also forward the received message packet based on a predetermined duration or a predetermined byte length. The predetermined duration or the predetermined byte length can be set based on actual needs, which are not limited in this specification. For example, the relay node can forward the received message packet every 5 seconds or the relay node can forward the message packet after receiving a message packet of every 5 bytes, which is not limited in this specification.

The object identifier included in the encapsulation information can be the node identifier of the blockchain node and/or the set identifier of the blockchain node set. When the object identifier is a set identifier, the relay node can determine all blockchain nodes in the target blockchain set corresponding to the set identifier and the target relay node in the blockchain relay communication network and connected to the blockchain node in the target blockchain set, by querying the routing table.

After the relay node determines the target relay node, if the relay node itself pertains to the target relay node, the relay node transmits the received message packet to the target blockchain node based on the target blockchain node connected to the relay node, which is, to transmit each part of the message to be transmitted to the target blockchain node; if the relay node is not the target blockchain node, or there is another target relay node besides the relay node, the relay node can transmit the received message packet to the target relay node for the target relay node to forward the received message packet to the connected target blockchain node. When the relay node transmits the received message packet to the target relay node, if the relay node can be directly connected to the target relay node, the received message packet can be directly transmitted to the target relay node. If the relay node is not directly connected to the target relay node, the relay node can plan a transmission path between the relay node and the target relay node, and send the received message packet to a relay node at next hop in the transmission path, for the message packet to reach the target relay node along the transmission path.

As previously described, the routing table can be generated by the relay node in the blockchain relay communication network, and the routing table can be configured to record a blockchain node set to which each blockchain node pertains and the connection relationship between each blockchain node and the relay node, where the routing table can be a tree-structured routing table, or the like, which is not limited in this specification. Accordingly, the relay node can determine, by querying the routing table, the target blockchain node registered to the target blockchain node set and the target relay node in the blockchain relay communication network and connected to the target blockchain node for the target relay node, to transmit the message to be transmitted to each target blockchain node.

There can be a large number of routing policies in the routing table. If the relay node matches the encapsulation information of the message to be transmitted in the full quantity of routing policies every time, too much time can be consumed. Therefore, the relay nodes in the blockchain relay communication network can be classified into a plurality of relay sets, and the relay nodes in each relay set maintain two routing tables: a set routing table and a full routing table. The full routing table is configured to record routing policies formed by the registration requests received by all the relay nodes in the blockchain relay communication network. Moreover, each relay set has different set routing tables, and each set routing table is used for recording a routing policy formed by the registration requests directly received by the relay nodes in the corresponding relay set from the connected blockchain nodes. Therefore, two hierarchies of routing tables are maintained in each relay node: after receiving the encapsulation information of the message to be transmitted, the relay node first finds matches in the set routing table maintained by the relay node. If the target relay node can be determined, it is not necessary to use the full routing table. If the target relay node cannot be determined or cannot be determined completely, the relay node further finds matches in the full routing table to determine the target relay node.

In addition to the secondary routing composed of the set routing table and the full routing table, other forms can be adopted. For example, a relay node can maintain a set routing table corresponding to a relay set in which the relay node is located and a supplementary routing table corresponding to the set routing table, where a union of the set routing table and the supplementary routing table is the full routing table. After receiving the encapsulation information of the message to be transmitted, the relay node first finds matches in the set routing table maintained by the relay node. If the target relay node can be determined, it is not necessary to use the supplementary routing table. If the target relay node cannot be determined or cannot be fully determined, the relay node finds matches in the supplementary routing table, which can avoid repeated matching of the routing policies in the set routing table as compared with matching in the full routing table.

When the encapsulation information of the message to be transmitted received by the relay node indicates that the blockchain message in the message to be transmitted is the block synchronization message and the encapsulation information does not include the object identifier for indicating the target transmission object of the message to be transmitted, the relay node can broadcast each part of the message to be transmitted to the blockchain node connected to the relay node and another relay node in the blockchain relay communication network, that is, the relay node can broadcast the received message packet to the blockchain node connected to the relay node and another relay node in the blockchain relay communication network, so that the blockchain node and the another relay node can both receive the message to be transmitted, thus ensuring normal sending of the message to be transmitted.

When the blockchain messages generated by the blockchain node is encapsulated by using an access protocol to form the message content of the previously mentioned message to be transmitted, and relay nodes in the blockchain relay communication network communicate by using a transmission protocol, the relay node can also reconstruct a partial message content of the message to be transmitted recorded in the received message packet based on the transmission protocol, so that the reconstructed message packet can be transmitted normally between the relay nodes, and the message to be transmitted can be guaranteed to be transmitted to the target transmission object.

Certainly, if the access protocol adopted for encapsulating the blockchain message into the message content of the message to be transmitted is consistent with the transmission protocol adopted by each relay node in the blockchain relay communication network, the relay node does not need to reconstruct the message content of the message to be transmitted recorded in the received message packet.

Take the nodes 21 to 25 and the node 21 sending the message A to be transmitted to the blockchain node set Group01 as example: the relay 11 can obtain the encapsulation information of the message A to be transmitted sent by the node 21 by parsing the message packet received from the node 21. The relay 11 can determine that the blockchain message in the message A to be transmitted is the block synchronization message based on the raw_data_type field in the encapsulation information, and can determine that the target transmission object of the message A to be transmitted is the blockchain node set Group01 based on the to field in the encapsulation information.

The relay 11 can determine, by querying the routing table, that the blockchain nodes is the blockchain node set Group01 are the node 24 and the node 25, the target relay node in the blockchain relay communication network and connected to the node 24 and the node 25 is the relay 14, and a route forwarding path between the relay 11 and the relay 14 is "relay 11-relay 12-relay 14". Therefore, the relay 11 can forward the received message packet to the relay 12 first. The relay 12 can obtain the above encapsulation information by parsing the received message packet, and the relay node 12 can also find that the target relay node is the relay 14. Therefore, the relay 12 can forward the received message packet to the relay 14. After receiving the message packet, the relay 14 finds that the target relay node is the relay 14 and the target blockchain nodes are the node 24 and the node 25, so the relay 14 forwards the received message packet to the node 24 and the node 25.

Similarly, the relay 11 can immediately forward the received message packet to the relay 12 after receiving each message packet of the message A to be transmitted. After receiving the message packet, the relay 12 finds that the target relay node is the relay 14, so the relay 12 forwards the message packet to the relay 14. After receiving the message packet, the relay 14 finds that the target relay node is the relay 14 and the target blockchain nodes are the node 24 and the node 25, so the relay 14 forwards the message packet to the node 24 and the node 25. The relay 11 can continuously receive the message packet of the message A to be transmitted and forward the received message packet to the relay 12 until all message packets of the message A to be transmitted are received and forwarded, that is, all the message contents of the message A to be transmitted are received. In this case, the relay node of the blockchain relay communication network can start forwarding partial data of the message A to be transmitted without completely receiving the message A. The relay node can forward the received part data of the message A to be transmitted at the same time when receiving data of the message A to be transmitted, so that each relay node does not need to wait for a time of completely receiving the message A to be transmitted, which is beneficial to the rapid forwarding of the block synchronization message and can reduce sending and receiving delay in the blockchain relay communication network.

Certainly, when the blockchain node transmits a large amount of data messages like the block synchronization message through the blockchain relay communication network, all the relay nodes in the blockchain relay communication network can receive the large amount of data messages and forward the large amount of data messages received at a same-time, which is beneficial to the rapid forwarding of the large amount of data messages and can reduce the sending and receiving delay in the blockchain relay communication network.

In the technical solution of this specification, when the relay node in the blockchain relay communication network determines that the blockchain message is the block synchronization message based on the encapsulation information, the relay node can forward each part of the received message to be transmitted without completely receiving the message to be transmitted. On one hand, the relay node does not need to determine the type of the blockchain message by parsing or identifying the blockchain message in the message to be transmitted, which can avoid invading the blockchain service logic corresponding to the blockchain message, make each relay node in the blockchain relay communication network transparent to the blockchain service logic, and improve the processing efficiency of the relay node on the blockchain message. On the other hand, the relay node can forward the received message to be transmitted while receiving the message to be transmitted, so that each relay node does not need to wait for the time of receiving the message to be transmitted, which is beneficial to the rapid forwarding of the block synchronization message and can reduce the sending and receiving delay in the blockchain relay communication network. Meanwhile, the relay node can determine the target transmission object of the message to be transmitted based on the encapsulation information in the message to be transmitted, thus realizing purposeful message transmission without unnecessary data interaction between the relay nodes or between the relay nodes and the blockchain nodes, eliminating blindness in message transmission based on a P2P technology in the related art, accelerating the transmission speed of the blockchain message, and reducing the resource consumption of the blockchain relay communication network.

FIG. 5 is a flowchart of a message transmission method, according to an explanatory embodiment. As shown in FIG. 5, this method can be applied to an encapsulation node in a blockchain network. The encapsulation node can be deployed on each blockchain node, gateway or relay node shown in FIG. 1. Certainly, the encapsulation node can also be deployed on another device independent of the blockchain node, the gateway and the relay node, which is not limited in this specification. The method can include the following steps.

Step 502. Obtaining a blockchain message generated by a blockchain node.

The encapsulation node can receive a blockchain message generated by a connected blockchain node. The blockchain message can be generated by communication operations such as consensus, transaction transmission and block synchronization between the blockchain nodes, which is not limited in this specification.

Step 504. Adding encapsulation information before the blockchain message to encapsulate the blockchain message into a message to be transmitted, where the encapsulation information is configured to indicate a type of the blockchain message.

The encapsulation node can add the encapsulation information before the obtained blockchain message, so that a message to be transmitted including the encapsulation information and the blockchain message can be generated. For a specific implementation process of step 504, refer to step 302. Details are not described herein again.

Step 506. Partitioning a partial message content of the message to be transmitted into a message packet, and sending the message packet to a relay node corresponding to the blockchain node in a blockchain relay communication network for the relay node to forward the received message packet without receiving all message packets corresponding to the message to be transmitted, when the blockchain message is determined to be a block synchronization message according to the encapsulation information.

The encapsulation node can send the message to be transmitted to a relay node in the blockchain relay communication network corresponding to the blockchain node, so that the message to be transmitted can be processed by the relay node. For a specific implementation process of step 506, refer to step 304. Details are not described herein again.

Figure 6:
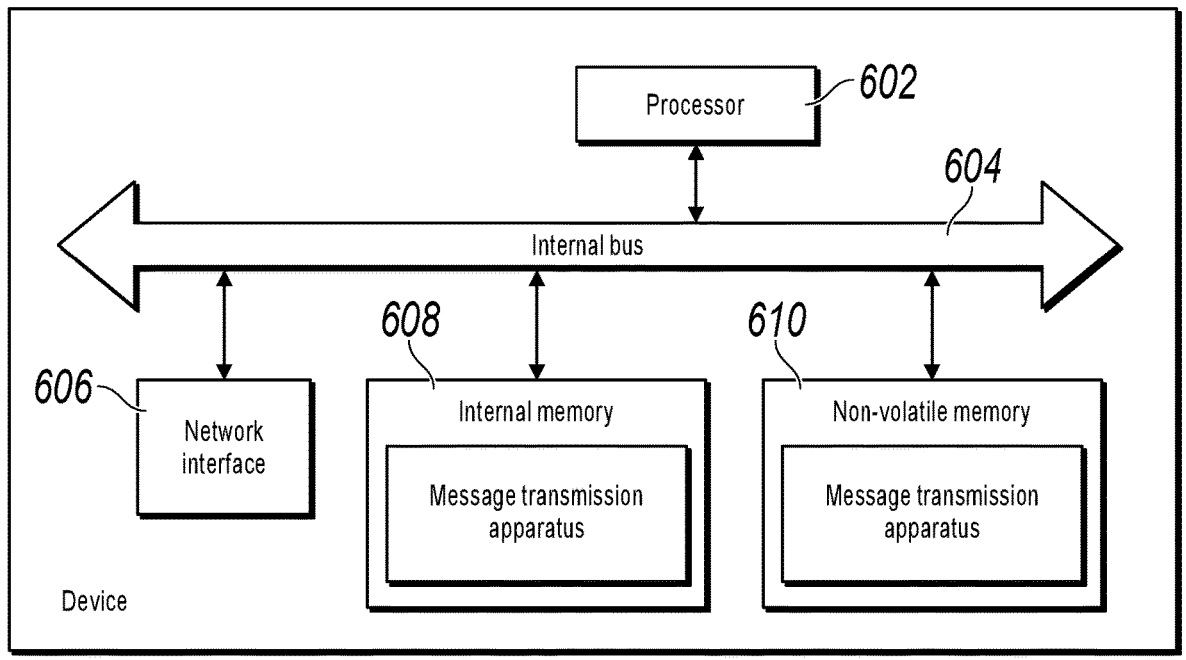
FIG. 6 is a schematic structural diagram of an electronic device, according to an explanatory embodiment.

FIG. 6 is a schematic structural diagram of an electronic device, according to an explanatory embodiment. Referring to FIG. 6, at a hardware level, the device includes a processor 602, an internal bus 604, a network interface 606, a memory 608, and a non-volatile memory 610, and certainly can further include hardware required for other services. The processor 602 reads a corresponding computer program from the non-volatile memory 610 into the memory 608 and then executes the computer program, to form a message transmission apparatus at a logic level. Certainly, in addition to a software implementation, one or more embodiments of this specification do not exclude other implementations, for example, logic devices or a software-hardware combination. That is, execution bodies of the following processing procedures are not limited to logic units and can alternatively be hardware or logic devices.

Figure 7:
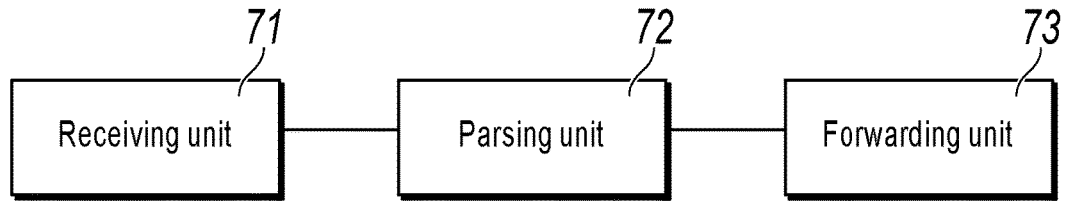
FIG. 7 is a block diagram of a message transmission apparatus, according to an explanatory embodiment.

Referring to FIG. 7, in a software implementation, the message transmission apparatus can include:

a receiving unit 71, configured to receive a message packet, each message packet being configured to record a partial message content of a message to be transmitted;

a parsing unit 72, configured to parse the received message packet to obtain encapsulation information of the message to be transmitted, the encapsulation information being configured to indicate a type of a blockchain message located behind the encapsulation information in the message to be transmitted; and a forwarding unit 73, configured to, if the encapsulation information indicates that the blockchain message is a block synchronization message, forward the received message packet without receiving all message packets corresponding to the message to be transmitted.

Optionally, the receiving unit 71 is specifically configured to:

receive the message packet from a connected blockchain node; or, receive the message packet from another relay node in the blockchain relay communication network.

Optionally, the encapsulation information includes an object identifier for indicating a target transmission object of the message to be transmitted; and the forwarding unit 73 is specifically configured to:

determine a target blockchain node corresponding to the object identifier; and transmit the received message packet to the target blockchain node.

Optionally, the forwarding unit 73 is specifically configured to:

determine, by querying a routing table, the target blockchain node corresponding to the object identifier and a target relay node in the blockchain relay communication network and connected to the target blockchain node, the routing table being configured to record a connection relationship between each blockchain node and the relay node.

Optionally, the forwarding unit 73 is specifically configured to:

transmit the message packet to a connected target blockchain node; or, in a case that the target relay node is another relay node in the blockchain relay communication network, transmit the message packet to the target relay node for the target relay node to transmit the message packet to the connected target blockchain node.

Optionally, the object identifier is a node identifier of a blockchain node, and the target transmission object includes a target blockchain node corresponding to the node identifier; or, the object identifier is a set identifier of a blockchain node set, and the target transmission object includes all blockchain nodes in a target blockchain node set corresponding to the set identifier.

Optionally, the encapsulation information is further configured to indicate a message type of the message to be transmitted;

when the message type of the message to be transmitted is a first type, the object identifier is the node identifier of the blockchain node; and when the message type of the message to be transmitted is a second type, the object identifier is the set identifier of the blockchain node set.

Optionally, the forwarding unit 73 is specifically configured to:

broadcast the message packet to the connected blockchain node and another relay node in the blockchain relay communication network, so that the blockchain node and the another relay node all receive the partial message content of the message to be transmitted recorded in the message packet.

Optionally, the forwarding unit 73 is specifically configured to:

in a case that the blockchain message is encapsulated by using an access protocol to form the message content of the message to be transmitted, and relay nodes in the blockchain relay communication network communicate by using a transmission protocol, reconstruct the partial message content of the message to be transmitted recorded in the message packet based on the transmission protocol, so that the reconstructed message packet is transmitted between the relay nodes.

Figure 8:
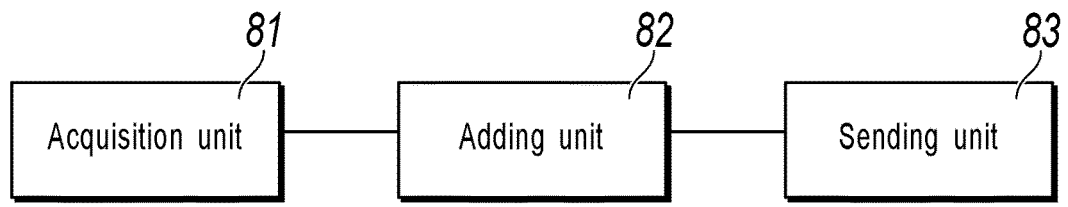
FIG. 8 is a block diagram of a message transmission apparatus, according to an explanatory embodiment.

Referring to FIG. 8, in a software implementation, the message transmission apparatus can include:

an acquisition unit 81, configured to obtain a blockchain message generated by a blockchain node;

an adding unit 82, configured to add encapsulation information before the blockchain message to encapsulate the blockchain message into a message to be transmitted, where the encapsulation information is configured to indicate a type of the blockchain message; and a sending unit 83, configured to partition a partial message content of the message to be transmitted into a message packet, and send the message packet to a relay node corresponding to the blockchain node in a blockchain relay communication network for the relay node to forward the received message packet without receiving all message packets corresponding to the message to be transmitted, when the blockchain message is determined to be a block synchronization message according to the encapsulation information.

The system, the apparatus, the module or the unit described in the previously described embodiments can be implemented by a computer chip or an entity, or implemented by a product with a certain function. A typical implementation device is a computer. A form of the computer can be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), one or more input/output interfaces, one or more network interfaces, and one or more memories.

The memory can be a form such as a volatile memory, a random-access memory (RAM), and/or a non-volatile memory such as a read-only memory (ROM) or a flash RAM in a computer-readable medium. The memory is an example of the computer-readable medium.

The computer-readable medium includes a persistent medium and a non-persistent medium, a removable medium and a non-removable medium, which can implement storage of information by using any method or technology. Information can be computer-readable instructions, a data structure, a module of a program, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. According to limitations of this specification, the computer-readable medium does not include transitory computer-readable media (transitory media), such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressly, or can include inherent elements of the process, method, product, or device. Without further limitation, the element defined by a phrase "include a/an . . . " does not exclude other same elements in the process, method, product or device which include the element.

Embodiments of this specification are described above. Other embodiments fall within the scope of the appended claims. In some cases, the actions or steps recorded in the claims can be performed in sequences different from those in the embodiments and an expected result may still be achieved. In addition, the processes depicted in the accompanying drawings is not expected to be performed in the specific order or successively to achieve an expected result. In some implementations, multitasking and parallel processing may be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like can be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when," or "in response to determination."

The previously described descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
    receiving, by a relay node in a blockchain relay communication network, a plurality of message packets corresponding to a message to be transmitted, each message packet configured to record a partial message content of the message to be transmitted, wherein the plurality of message packets are received from a blockchain node of a blockchain node set or from another relay node in the blockchain relay communication network;
    parsing, by the relay node, the plurality of message packets to obtain encapsulation information of the message to be transmitted, the encapsulation information configured to indicate a type of a blockchain message within the encapsulation information in the message to be transmitted;
    determining, by the relay node, that the encapsulation information indicates that the blockchain message is a block synchronization message;
    in response to determining that the encapsulation information indicates that the blockchain message is a block synchronization message, receiving, by the relay node, one or more message packets of the plurality of message packets as received one or more message packets; and
    after receiving, by the relay node, the one or more message packets of the plurality of message packets but before receiving, by the relay node, all of the plurality of message packets, sending, by the relay node, the received one or more message packets that comprises the partial message content to a target blockchain node or a target relay node in the blockchain relay communication network connected to the target blockchain node, to enable the target blockchain node or the target relay node to receive the partial message content.

2. The computer-implemented method according to claim 1, wherein the encapsulation information comprises an object identifier indicating a target transmission object of the message to be transmitted, and wherein sending the received one or more message packets comprises:
    determining that the target blockchain node corresponds to the object identifier; and
    transmitting the received one or more message packets to the target blockchain node.

3. The computer-implemented method according to claim 2, wherein determining that the target blockchain node corresponds to the object identifier comprises:
    determining, by querying a routing table, that the target blockchain node corresponds to the object identifier and that the target relay node in the blockchain relay communication network is connected to the target blockchain node, wherein the routing table records a connection relationship between each blockchain node and the relay node.

4. The computer-implemented method according to claim 3, comprising:
    transmitting the received one or more message packets to the target relay node for the target relay node to transmit to the target blockchain node.

5. The computer-implemented method according to claim 2, wherein:
    the object identifier is a node identifier of the target blockchain node, and the target transmission object comprises the target blockchain node corresponding to the node identifier; or
    the object identifier is a set identifier of a target blockchain node set comprising the target blockchain node, and the target transmission object comprises all target blockchain nodes in the target blockchain node set corresponding to the set identifier.

6. The computer-implemented method according to claim 5, wherein the encapsulation information indicates a message type of the message to be transmitted, wherein, when the message type of the message to be transmitted is a first type, the object identifier is the node identifier of the target blockchain node, and wherein, when the message type of the message to be transmitted is a second type, the object identifier is the set identifier of the blockchain node set.

7. The computer-implemented method according to claim 1, wherein the blockchain message is encapsulated by using an access protocol to form the partial message content of the message to be transmitted, wherein relay nodes in the blockchain relay communication network communicate by using a transmission protocol, and wherein sending the received one or more message packets comprises:

reconstructing, as a reconstructed message packet, the partial message content of the message to be transmitted recorded in the received one or more message packets according to the transmission protocol to allow the reconstructed message packet to transmit between the relay nodes.

8. The computer-implemented method according to claim 1, wherein sending the received one or more message packets to the target blockchain node or the target relay node is based upon a predetermined duration or a predetermined byte length of the one or more message packets.

9. A non-transitory, computer-readable medium storing one or more instructions executable by a computer system to perform operations comprising:

receiving, by a relay node in a blockchain relay communication network, a plurality of message packets corresponding to a messgae to be transmitted, each message packet configured to record a partial message content of the message to be transmitted, wherein the plurality of message packets are received from a blockchain node of a blockchain node set or from another relay node in the blockchain relay communication network;

parsing, by the relay node, the plurality of message packets to obtain encapsulation information of the message to be transmitted, the encapsulation information configured to indicate a type of a blockchain message within the encapsulation information in the message to be transmitted;

determining, by the relay node, that the encapsulation information indicates that the blockchain message is a block synchronization message;

in response to determining that the encapsulation information indicates that the blockchain message is a block synchronization message, receiving, by the relay node, one or more message packets of the plurality of message packets as received one or more message packets; and after receiving, by the relay node, the one or more message packets of the plurality of message packets but before receiving, by the relay node, all of the plurality of message packets, sending, by the relay node, the received one or more message packets that comprises the partial message content to a target blockchain node or a target relay node in the blockchain relay communication network connected to the target blockchain node, to enable the target blockchain node or the target relay node to receive the partial message content.

10. The non-transitory, computer-readable medium according to claim 9, wherein the encapsulation information comprises an object identifier indicating a target transmission object of the message to be transmitted, and wherein sending the received one or more message packets comprises:

determining that the target blockchain node corresponds to the object identifier; and transmitting the received one or more message packets to the target blockchain node.

11. The non-transitory, computer-readable medium according to claim 10, wherein determining that the target blockchain node corresponds to the object identifier includes one or more operations comprising:

determining, by querying a routing table, that the target blockchain node corresponds to the object identifier and that the target relay node in the blockchain relay communication network is connected to the target blockchain node, wherein the routing table records a connection relationship between each blockchain node and the relay node.

12. The non-transitory, computer-readable medium according to claim 11, wherein transmitting the received one or more message packets to the target blockchain node includes one or more operations comprising:

transmitting to the target blockchain node.

13. The non-transitory, computer-readable medium according to claim 10, wherein:

the object identifier is a node identifier of the target blockchain node, and the target transmission object comprises a target blockchain node corresponding to the node identifier; or the object identifier is a set identifier of a target blockchain node set comprising the target blockchain node, and the target transmission object comprises all target blockchain nodes in the target blockchain node set corresponding to the set identifier.

14. The non-transitory, computer-readable medium according to claim 13, wherein the encapsulation information indicates a message type of the message to be transmitted, wherein, when the message type of the message to be transmitted is a first type, the object identifier is the node identifier of the target blockchain node, and wherein, when the message type of the message to be transmitted is a second type, the object identifier is the set identifier of the blockchain node set.

15. The non-transitory, computer-readable medium according to claim 10, wherein the blockchain message is encapsulated by using an access protocol to form the partial message content of the message to be transmitted, wherein relay nodes in the blockchain relay communication network communicate by using a transmission protocol, and wherein forwarding the received one or more message packets includes one or more operations comprising:

reconstructing, as a reconstructed message packet, the partial message content of the message to be transmitted recorded in the one or more message packets according to the transmission protocol to allow the reconstructed message packet to transmit between the relay nodes.

16. The non-transitory, computer-readable medium according to claim 9, wherein sending the received one or more message packets to the target blockchain node or the target relay node is based upon a predetermined duration or a predetermined byte length of the one or more message packets.

17. A computer-implemented system, comprising:

one or more computers; and one or more computer memory devices interoperably coupled with the one or more computers and having non-transitory machine-readable media storing one or more instructions executable by the one or more computers to perform one or more operations comprising:

receiving, by a relay node in a blockchain relay communication network, a plurality of message packets corresponding to a message to be transmitted, each message packet configured to record a partial message content of the message to be transmitted, wherein the plurality of message packets are received from a blockchain node of a blockchain node set or from another relay node in the blockchain relay communication network;

parsing, by the relay node, the plurality of message packets to obtain encapsulation information of the message to be transmitted, the encapsulation information configured to indicate a type of a blockchain message within the encapsulation information in the message to be transmitted;

determining, by the relay node, that the encapsulation information indicates that the blockchain message is a block synchronization message;

in response to determining that the encapsulation information indicates that the blockchain message is a block synchronization message, receiving, by the relay node, one or more message packets of the plurality of message packets as received one or more message packets; and after receiving, by the relay node, the one or more message packets of the plurality of message packets but before receiving, by the relay node, all of the plurality of message packets, sending, by the relay node, the received one or more message packets that comprises the partial message content to a target blockchain node or a target relay node in the blockchain relay communication network connected to the target blockchain node, to enable the target blockchain node or the target relay node to receive the partial message content.

18. The computer-implemented system of claim 17, wherein the encapsulation information comprises an object identifier indicating a target transmission object of the message to be transmitted, and wherein sending the received one or more message packets comprises:

determining that the target blockchain node corresponds to the object identifier; and transmitting the received one o more message packets to the target blockchain node.

19. The computer-implemented system of claim 18, wherein determining that the target blockchain node corresponds to the object identifier includes one or more operations comprising:

determining, by querying a routing table, that the target blockchain node corresponds to the object identifier and that the target relay node in the blockchain relay communication network is connected to the target blockchain node, wherein the routing table records a connection relationship between each blockchain node and the relay node.

20. The computer-implemented system of claim 17, wherein sending the received one or more message packets to the target blockchain node or the target relay node is based upon a predetermined duration or a predetermined byte length of the one or more message packets.

* * * * *